US007035462B2

(12) United States Patent
White et al.

(10) Patent No.: US 7,035,462 B2
(45) Date of Patent: Apr. 25, 2006

(54) APPARATUS AND METHOD FOR PROCESSING DIGITAL IMAGES HAVING EYE COLOR DEFECTS

(75) Inventors: Timothy J. White, Webster, NY (US); Felix Blanco, Rochester, NY (US); Michael J. Gerard, Webster, NY (US); Yojin Leem, Rochester, NY (US); Thomas J. Kurtenbach, Rochester, NY (US); Douglas W. Christoffel, Rochester, NY (US); Kevin R. Delong, Victor, NY (US); Craig M. Smith, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 667 days.

(21) Appl. No.: 10/230,913

(22) Filed: Aug. 29, 2002

(65) Prior Publication Data

US 2004/0041924 A1 Mar. 4, 2004

(51) Int. Cl.
*G06K 9/00* (2006.01)
*G06K 9/40* (2006.01)
(52) U.S. Cl. ..................... 382/167; 382/275
(58) Field of Classification Search .............. 382/115, 382/117, 162, 164, 167, 168, 171, 172, 181, 382/203, 214, 254, 260, 274, 275; 348/222, 348/239, 370, 371, 376, 576, 577; 358/506, 358/518, 521, 527; 345/581; 396/158
See application file for complete search history.

(56) References Cited

U.S. PATENT DOCUMENTS

| | | | |
|---|---|---|---|
| 3,971,065 A | | 7/1976 | Bayer |
| 4,531,150 A | * | 7/1985 | Amano ................. 358/506 |
| 4,831,434 A | * | 5/1989 | Fuchsberger .......... 358/521 |
| 5,130,789 A | | 7/1992 | Dobbs et al. |
| 5,432,863 A | | 7/1995 | Benati et al. |
| 5,596,346 A | | 1/1997 | Leone et al. |
| 5,748,764 A | | 5/1998 | Benati et al. |
| 5,892,837 A | | 4/1999 | Luo et al. |

(Continued)

OTHER PUBLICATIONS

PC Card Standard, Release 2.0, Sep. 1991, Published by Personal Computer Memory Card International Association (PCMCIA).

(Continued)

*Primary Examiner*—Andrew W. Johns
*Assistant Examiner*—Amir Alavi
(74) *Attorney, Agent, or Firm*—Susan L. Parulski

(57) ABSTRACT

An apparatus and method for processing digital images having eye color defects. In one method for detecting and correcting eye color defects of a subject in a digital image, the steps comprise: (a) processing the digital image to automatically detect one or more candidate positions of eye color defects in the digital image; (b) automatically applying an eye color defect algorithm to the digital image at the detected candidate positions to automatically correct for the eye color defect; (c) displaying, on a display, at least a portion of the digital image comprising at least one of the corrected eye color defects; and (d) displaying, on the display, an indicator located proximate the at least one of the corrected eye color defects indicative of the at least one of the corrected eye color defects.

42 Claims, 12 Drawing Sheets

U.S. PATENT DOCUMENTS

| | | | |
|---|---|---|---|
| 5,990,901 A * | 11/1999 | Lawton et al. | 345/581 |
| 6,016,354 A * | 1/2000 | Lin et al. | 382/117 |
| 6,072,893 A | 6/2000 | Luo et al. | |
| 6,134,339 A | 10/2000 | Luo | |
| 6,151,403 A | 11/2000 | Luo | |
| 6,252,976 B1 | 6/2001 | Schildkraut et al. | |
| 6,292,574 B1 | 9/2001 | Schildkraut et al. | |
| 6,407,777 B1 | 6/2002 | DeLuca | |
| 6,631,208 B1 * | 10/2003 | Kinjo et al. | 382/167 |
| 6,873,743 B1 * | 3/2005 | Steinberg | 382/275 |
| 6,885,766 B1 * | 4/2005 | Held et al. | 382/167 |
| 2004/0041924 A1 * | 3/2004 | White et al. | 348/239 |

OTHER PUBLICATIONS

Patent Application, U.S. Appl. No. 09/290,290—Entitled: Eye Color Defect Detection and Correction in a Digital Image, John R. Fredlund, et al, Filed Apr. 13, 1999.

Patent Application, U.S. Appl. No. 09/975,903. Entitled: Method and Apparatus for Printing and/or Displaying Digital Images, Thomas J. Murray, et al, Filed Oct. 12, 2001.

* cited by examiner

APPARATUS AND METHOD FOR PROCESSING DIGITAL IMAGES HAVING EYE COLOR DEFECTS

CROSS REFERENCE TO RELATED APPLICATION

Reference is made to commonly assigned application U.S. Ser. No. 09/290,290, entitled "EYE COLOR DEFECT DETECTION AND CORRECTION IN A DIGITAL IMAGE", filed on Apr. 13, 1999 in the names of John R. Fredlund et. al., and which is assigned to the assignee of this application.

Reference is also made to commonly assigned application U.S. Ser. No. 09/975,903, entitled "METHOD AND APPARATUS FOR PRINTING AND/OR DISPLAYING DIGITAL IMAGES", filed on Oct. 12, 2001 in the names of Thomas J. Murray et al., and which is assigned to the assignee of this application, which is a continuation-in-part of application U.S. Ser. No. 09/249,573, filed Feb. 12, 1999.

FIELD OF THE INVENTION

The present invention relates generally to digital image processing. More specifically, the invention relates to processing digital images having eye color defects.

BACKGROUND OF THE INVENTION

When flash illumination is used for the capture of an image, the pupils of a person in the image may appear to be red. This phenomena is often referred to as "red-eye". This eye color defect is caused by light from the flash unit entering the pupil, reflecting off the retina, and exiting back through the pupil. Because light is partially absorbed by capillaries in the retina, the pupil appears to be red in the image. A person's photographically reproduced pupils which exhibit the red-eye phenomenon differ from normal pupils in that they appear red instead of their normal black coloration, and they are brighter. The probability of red-eye being observed increases the closer the flash unit is to the optical axis of the lens, so red-eye is commonly observed in images captured by a small camera with an integral flash unit. Red-eye becomes particularly noticeable when the image is enlarged. Thus, the red-eye phenomenon destroys many otherwise acceptable photographs. It is noted that this phenomena also occurs in flash photography of animals, although the characteristic color may not be red.

The phenomena of red-eye has been the subject of several patents. U.S. Pat. Nos. 5,130,789 (Dobbs et al.), U.S. Pat. No. 5,596,346 (Leone et al.), U.S. Pat. No. 6,252,976 (Schildkraut et al.), all commonly assigned and incorporated herein by reference, relate to the detection and/or removal of red-eye. U.S. Pat. No. 6,407,777 (DeLuca) is directed to a red-eye filter method and apparatus for a digital camera.

When an image is digital, it is possible to process the image with an algorithm which will locate areas suspected of being red eyes. If the algorithm is very accurate, only red-eye defects in the image will be detected and modified, often by desaturating the red area. The remaining portions of the image will be unchanged. However, present red-eye locating algorithms can be of limited accuracy. Often, user assistance is required to correct for red-eye.

In correcting for red-eye in images, the human eye-is located and the undesirable red portion in the eye is replaced with a more aesthetically pleasing color. As such, with user-assisted red-eye correction techniques, a user interface technique is needed to allow an operator/user to precisely identify a localized area of a digital image. Typically, the image is displayed and a point type location indicator is displayed (e.g., an arrow, cross hairs, touch, etc.) which indicates where the application "thinks" the operator is pointing. If a touch screen is used, one eye can be repeatably touched for further zooming in on the red portion of the eye upon each touch. Alternatively, a keyboard or other device (e.g., a joystick) is used to move the point type location indicator. The red portion is identified and a function is applied to the area to replace the red with another color.

This method of correcting red-eye requires constant human interaction, and as a result, is somewhat labor intensive. In addition, for the novice operator/user, this method may be confusing or not intuitive, causing the operator to be "satisfied" with a potentially unpleasing image rather than go through the process of understanding/ learning how to remove the red-eye defect. In addition, a user may not recognize that red-eye exists in the image until the image is enlarged.

Accordingly, a need continues to exist for an automated method of informing a user that eye color defects exists, and a method of processing an image to correct for eye color defects which requires reduced input from a user so as to be less labor intensive and more intuitive than existing methods.

SUMMARY OF THE INVENTION

Accordingly, it is an object of at least one embodiment of the present invention to provide a method for correcting selected candidate positions of eye color defects in a digital image.

Another object of at least one embodiment of the invention is to provide a method which informs a user of the existence of eye color defects.

Still another object of at least one embodiment of the invention is to provide a method of processing an image to correct eye color defects which requires reduced input from a user.

Another object of at least one embodiment of the present invention is to indicate to a user, the portions of the digital image which have been corrected for eye color defects.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an imaging device for correcting eye color defects of a subject in a digital image. The imaging device comprises: (a) accessing means for accessing the digital image; (b) processing means for detecting one or more candidate positions of eye color defects in the digital image; (c) automatic correction means for applying an eye color defect algorithm to the digital image at the detected candidate positions to automatically correct for the eye color defect; (d) a display for presenting at least a portion of the digital image comprising at least one of the one or more corrected eye color defects; and (e) at least one indicator, presented on the display, indicating the at least one of the one or more corrected eye color defects.

According to another aspect of the invention, there is provided an imaging device for correcting eye color defects of a subject in a digital image. The imaging device comprises: (a) accessing means for accessing the digital image; (b) processing means for detecting one or more candidate positions of eye color defects in the digital image; (c) automatic correction means for applying an eye color defect algorithm to the digital image at the detected candidate positions to automatically correct for the eye color defect; (d) a display comprising (i) a first viewing area displaying the digital image comprising at least one of the one or more corrected eye color defects, and (ii) a second viewing area proximate the first viewing area displaying a portion of the digital image displayed in the first viewing area; and (e) at least one indicator, displayed in the first viewing area or the second viewing area, indicating the at least one of the one or more corrected eye color defects.

According to a further aspect of the invention, there is provided a method for detecting and correcting eye color defects of a subject in a digital image. The method comprises the steps of: (a) processing the digital image to automatically detect one or more candidate positions of eye color defects in the digital image; (b) automatically applying an eye color defect algorithm to the digital image at the detected candidate positions to automatically correct for the eye color defect; (c) displaying, on a display, at least a portion of the digital image comprising at least one of the corrected eye color defects; (d) displaying, on the display, an indicator located proximate the at least one of the corrected eye color defects indicative of the at least one of the corrected eye color defects; (e) providing selection means for selecting the indicator; (f) applying the eye color defect algorithm to the selected at least one of the corrected eye color defects to generate a further corrected eye color defect; and (g) presenting, on the display, at least a portion of the digital image comprising the further corrected eye color defect.

According to yet a further aspect of the invention, there is provided a method for detecting and correcting eye color defects of a subject in a digital image. The method comprises the steps of: (a) processing the digital image to automatically detect one or more candidate positions of eye color defects in the digital image; (b) automatically applying an eye color defect algorithm to the digital image at the detected candidate positions to automatically correct for the eye color defect; (c) displaying, in a first viewing area of a display, the digital image comprising the corrected eye color defects; (d) displaying, in a second viewing area of the display proximate the first viewing area, a portion of the digital image displayed in the first viewing area; (e) displaying, in the first viewing area of the display, an indicator located proximate at least one of the corrected eye color defects indicative of the at least one of the corrected eye color defects; and (f) providing selection means for selecting the indicator.

At least one embodiment of the present invention provides a method of informing a user that red-eye exists, and a method of processing an image to remove/correct red-eye which requires reduced input from a user and to indicate to a user which portions of the digital image have been corrected for eye color defects.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
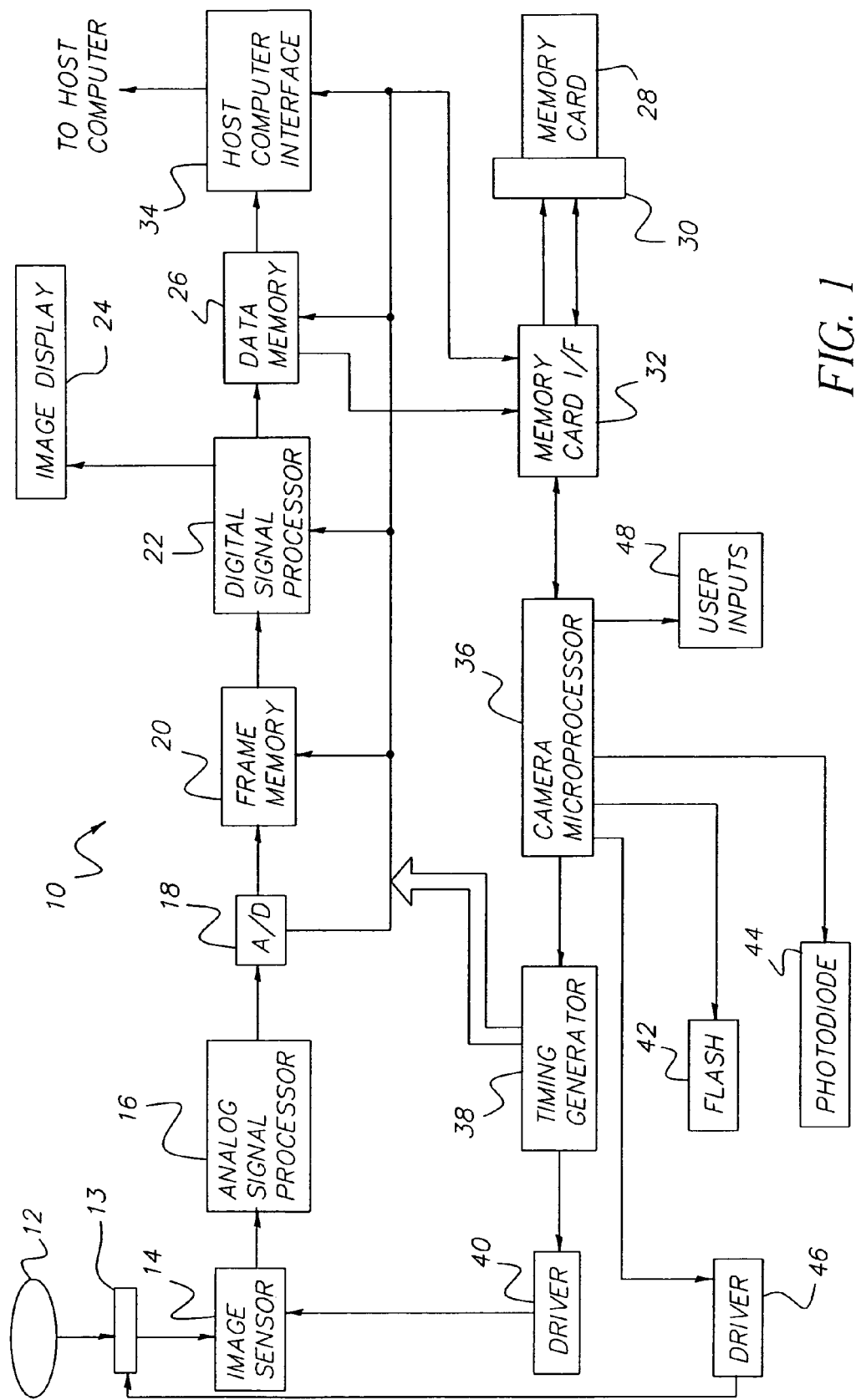
FIG. 1 is a block diagram of an electronic camera in accordance with the present invention.

The following is a detailed description of the preferred embodiments of the invention, reference being made to the drawings in which the same reference numerals identify the same elements of structure in each of the several figures.

Imaging devices employing displays and electronic sensors are well known, thus elements not specifically shown or described herein may be selected from those known in the art. Certain aspects of the embodiments to be described are provided in software. Given the system description as described in the following materials, all such software implementation is conventional and within the ordinary skill in such art.

For ease of convenience, the present invention is described with regard to eye color defects. However, those skilled in the art will recognize that the apparatus and method in accordance with the present invention can be applied to other image artifacts, including, but not limited to, scratches, tears, dust, blemishes, wrinkles, creases, hair, and specular highlights due to flash illumination.

The present invention can be applied to any imaging device/system which captures and/or processes digital images, including, but not limited to, digital cameras, kiosks, photoprocessing equipment having a display, mobile or hand-held devices (such as a PDAs or cellular phones), digital camcorder, and computers. However, for ease of convenience, the present invention will be described with reference to imaging devices of a digital camera and kiosk.

Referring to FIG. 1, there is shown a block diagram of an exemplary electronic camera 10 in accordance with the present invention, for example, the Kodak Digital Science DC210™ zoom camera sold by the Eastman Kodak Company. As shown in FIG. 1, electronic camera 10 includes a lens 12 which directs image light from a subject (not shown) through an aperture/shutter controller 13 upon an image sensor 14 having a discrete number of photosite elements or pixels arranged in a two-dimensional array to form individual photosites corresponding to the pixels of the image. Image sensor 14 can be either a conventional charge coupled device (CCD) sensor, such as, for example, the Kodak KAF-1600 sensor having 1536 columns and 1024 rows of photosites, or a complementary metal oxide semiconductor (CMOS) imager. The photosites of image sensor 14 convert the incident photons of light into electron charge packets. Each photosite is overlaid with a color filter array (CFA), such as the Bayer CFA described in commonly-assigned U.S. Pat. No. 3,971,065, the disclosure of which is herein incorporated by reference. The Bayer CFA has 50% green pixels in a checkerboard mosaic, with the remaining pixels alternating between red and blue rows. The photosites respond to the appropriately colored incident light illumination to provide an analog signal corresponding to the intensity of illumination incident on the photosites.

The analog output of each pixel is amplified and analog processed by an analog signal processor (ASP) 16 to reduce the image sensor's output amplifier noise. The output of ASP 16 is converted to a digital image signal by an analog-to-digital (A/D) converter 18, such as, for example, an 8 bit AID converter which provides an 8 bit signal in the sequence of the Bayer CFA.

The digitized image signal is temporarily stored in a frame memory 20, and is then processed and compressed by a digital signal processor (DSP) 22. The image processing includes white balance, color correction, tone correction, and image sharpening. DSP 22 decimates (or resamples) the digitized image signal for each still image to produce an image having fewer pixels (i.e., lower resolution) than the original captured image, and sends the decimated image data to an image display 24, such as a color liquid crystal display (LCD), where the user can view the image. The compressed image data can also be stored in a data memory 26 or, if a memory card 28 is present in a memory card slot 30 of the electronic camera 10, transferred through a memory card interface 32 to the memory card 28.

Memory card 28 can be adapted to the PCMCIA card interface standard, such as described in the PC Card Standard, Release 2.0, published by the Personal Computer Memory Card International Association, Sunnyvale, Calif., September 1991. Electrical connection between memory card 28 and electronic camera 10 is maintained through a card connector (not shown) positioned in memory card slot 30. Memory card interface 32 and the card connector provide, e.g., an interface according to the aforementioned PCMCIA card interface standard. The compressed image data may also be sent to a host computer (not shown), which is connected to electronic camera 10 through a host computer interface 34.

In operation, a camera microprocessor 36 receives user inputs 48, such as from a shutter release (not shown), and initiates a capture sequence by triggering a flash unit 42 (if needed) and signaling a timing generator 38. Timing generator 38 is connected generally to the elements of electronic camera 10, as shown in FIG. 1, for controlling the digital conversion, compression, and storage of the image signal. Camera microprocessor 36 also processes a signal from a photodiode 44 for determining a proper exposure, and accordingly signals an exposure driver 46 for setting the aperture and shutter speed via aperture/shutter controller 13. Image sensor 14 is then driven from timing generator 38 via a sensor driver 40 to produce the image signal. The user inputs 48 are used to control the operation of electronic camera 10 in a well-known manner.

Figure 2:
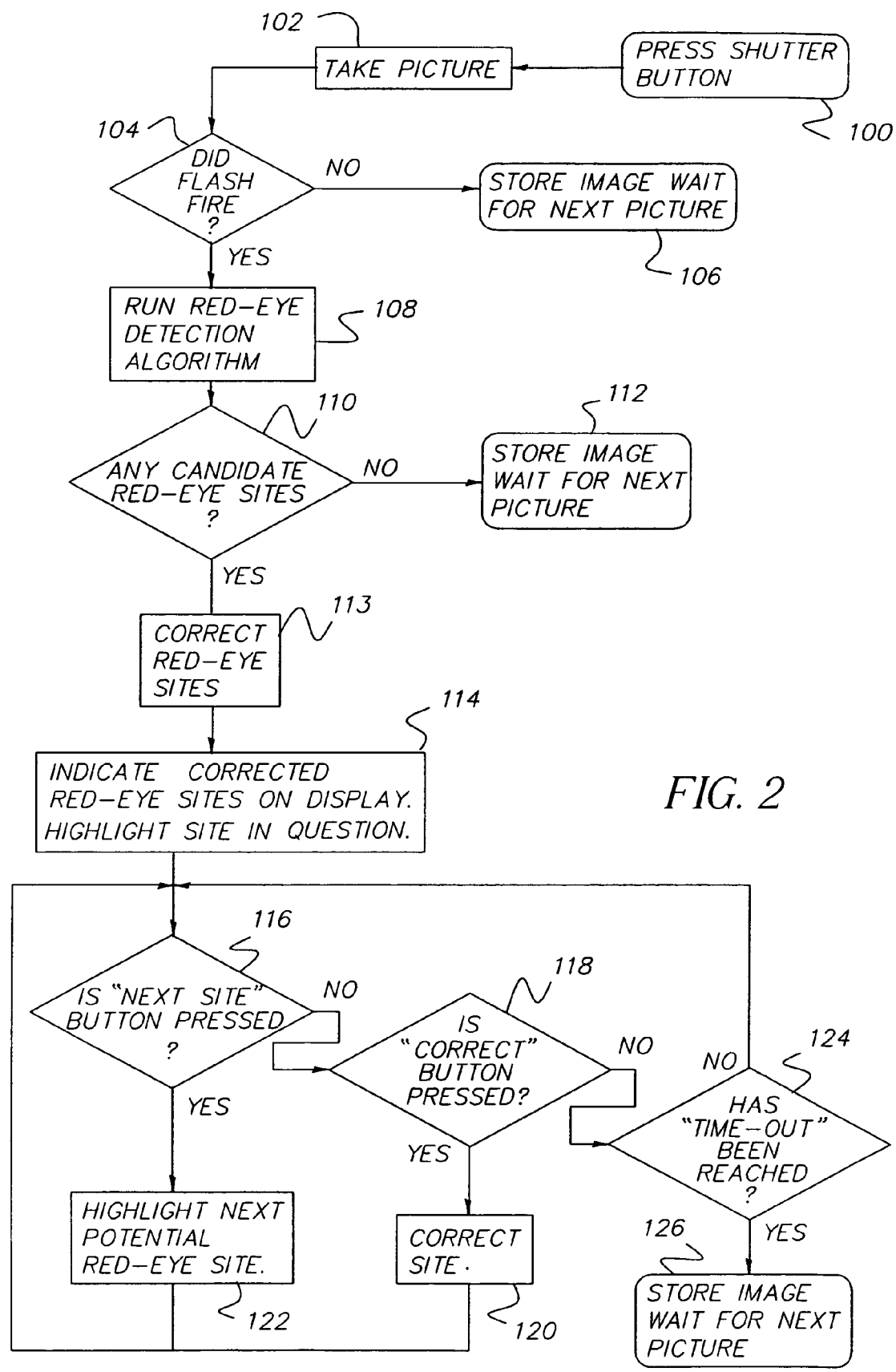
FIG. 2 is a flow diagram showing the operation of the electronic camera of FIG. 1 in accordance with a first embodiment of the present invention.

FIG. 2 shows a flow diagram of the operation of electronic camera 10. As shown, an image is captured electronically (block 102) by pressing the shutter button (not shown) on electronic camera 10 (block 100). If the image was captured using only ambient scene illumination (block 104), the digital image is processed by DSP 22 and stored (block 106). If flash unit 42 was triggered during image capture to provide for flash illumination (block 104), an eye color defect detection algorithm is automatically run to detect for one or more candidate positions of eye color defects in digital image (block 108). In accordance with the present invention, application program or software containing the eye color defect detection algorithm is stored in memory in DSP 22.

Examples of eye color defect detection algorithms which can be used in accordance with the present invention are disclosed in commonly-assigned U.S. Pat. Nos. 5,432,863 (Benati et al.), U.S. Pat. No. 5,748,764 (Benati et al.), U.S. Pat. No. 5,892,837 (Luo et al.), U.S. Pat. No. 6,072,893 (Luo et al.), U.S. Pat. No. 6,151,403 (Luo), U.S. Pat. No. 6,134,339 (Luo), U.S. Pat. No. 6,134,339 (Lou), U.S. Pat. No. 6,292,574 (Schildkraut et al.), and U.S. Pat. No. 6,252,976 (Schildkraut et al.), the disclosures of which are herein incorporated by reference.

Once the eye defect detection algorithm has run, it is determined if any candidate positions of eye color defects are detected in the digital image (block 110). If no candidate positions of eye color defects are detected, DSP 22 sends the image data to data memory 26 for storage (block 112). If one or more candidate positions of eye color defects are detected in the digital image, an eye color defect correction algorithm is automatically run to correct for the eye color defect at that candidate position (block 113). Accordingly, all the detected eye color defects are automatically corrected using the eye color defect correction algorithm.

In accordance with the present invention, the application program or software containing the eye color defect correction algorithm is stored in memory in DSP 22. Examples of eye color defect correction algorithms which can be used in accordance with the present invention are disclosed in commonly-assigned U.S. Pat. Nos. 5,432,863, 5,748,764 and 6,134,339, the disclosures of which are herein incorporated by reference.

The red-eye defect corrected image (i.e., the image comprising the corrected eye color defects, hereinafter referred to as the corrected image or enhanced image) is presented/displayed on LCD 24 of electronic camera 10. It would be understood by one skilled in the art that at this point, electronic camera 10 can present all or only a portion of the digital image which contains the corrected eye color defects. In this manner, a low resolution of LCD 24 can be matched to a stored image resolution.

In addition, all corrected positions of eye color defects are indicated on LCD by an indicator or other such distinctive mark (block 114). For example, a cross-hair located at or proximate to each corrected eye color defect.

Figure 3:
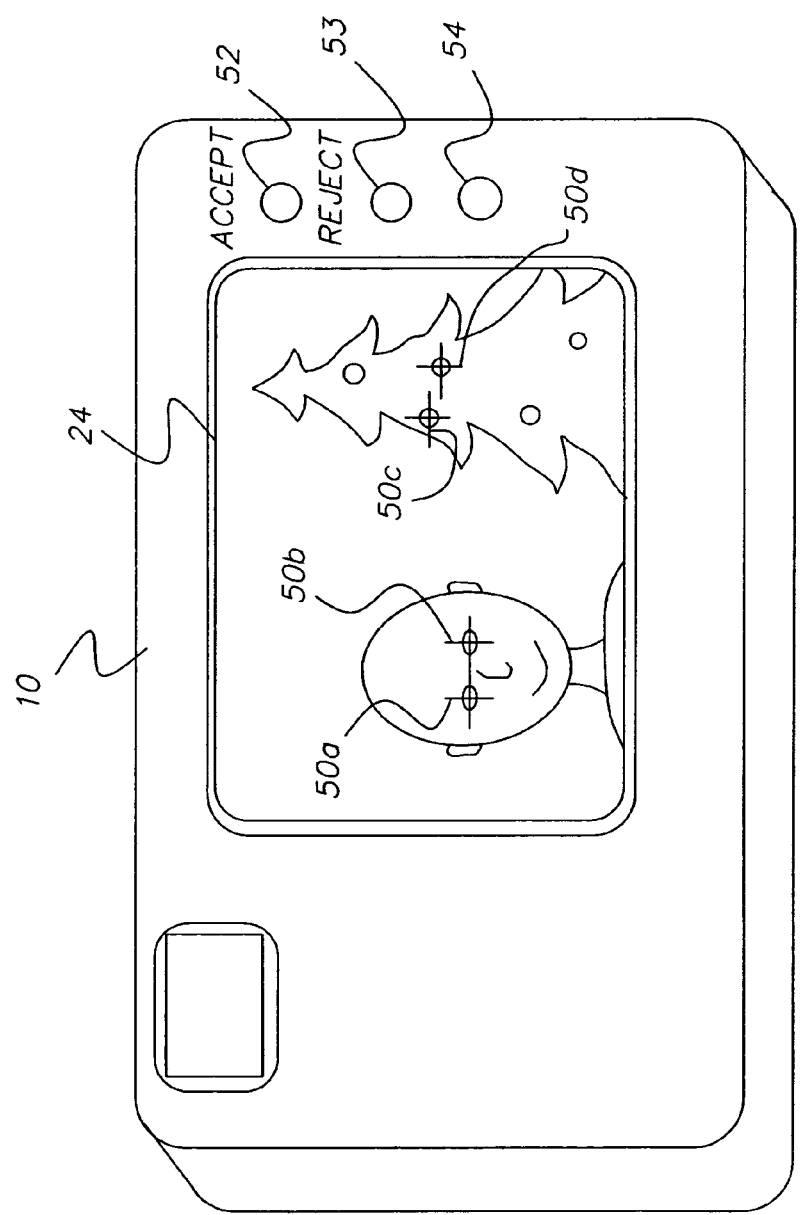
FIG. 3 is schematic of the image display on the electronic camera of FIG. 1, displaying an exemplary captured digital image and identifying detected candidate positions of eye color defects.

FIG. 3 is a schematic of LCD 24 on electronic camera 10 displaying an exemplary corrected image wherein electronic camera 10 captured the digital image. Indicators are displayed to indicate positions of eye color defects detected and automatically corrected by the eye color defect detection algorithm. As shown in FIG. 3, four positions of eye color defects (50a, 50b, 50c, and 50d) were detected and automatically corrected, and exemplary cross-hairs are used to indicate these four corrected positions in the corrected image.

At this point, the user can indicate acceptance of the corrected image, for example, by pressing a button 52 (which is one of user inputs 48 shown in FIG. 1) on electronic camera 10. Alternatively, the user can indicate rejection of the corrected image by pressing a button 53 (which in one of user inputs 48 shown in FIG. 1). In a further alternative, the user can choose which corrected position to further correct. That is, the user can manually move/navigate from one corrected position to another corrected position (blocks 116 and 122), and highlight that corrected position for further/additional correction. In the example shown in FIG. 3, the user may choose to further correct the positions 50c and 50d which were detected as red-eye, but were actually red Christmas tree lights. When a given corrected position is highlighted, as shown in FIG. 3, the user can select to further correct that position by pressing, for example, a button 54, which is one of the user inputs 48 shown in FIG. 1. For the present invention, "further correcting" may mean "uncorrecting" (i.e., in the present example, the user may desire to return the tree light to its original color). Upon pressing button 54, the eye color defect correction algorithm is automatically run to further/re-correct for the eye color defect at that position (blocks 118 and 120). For example, perhaps some level of red color remains in the eye. Alternatively, the user can select all corrected positions to be further corrected. Alternatively, the user can indicate the level of further correction at each corrected position by, for example, use of a slider control or up/down buttons (not shown) on electronic camera 10. In such an embodiment, the further correction of the eye color defect occurs in real-time as the user changes the correction level. Alternatively, the user may select a plurality of positions and apply a single further correction to the plurality of selected positions. Selection means can be provided for indicating acceptance or rejection of a corrected eye color defect.

It is understood that the an eye color defect may not have been detected, and accordingly, automatically corrected by eye color defect algorithm. Therefore, the present invention can include selection means for selecting at least one undetected candidate position of eye color defect, and correction means for applying the algorithm to the selected undetected candidate position, whereby the eye color defect is corrected.

It is noted that this eye color defect correction algorithm (i.e., the algorithm for further correction of corrected positions) can be, but does not need to be, the same algorithm automatically applied to the candidate positions. That is, the algorithms run at block 113 and 120 can be the same or different algorithm. If the same algorithm, variables/coefficients or variations can be changed to affect a different result. For example, the variables/coefficients may be changed to affect a more liberal detection/removal of the eye color defect or to affect a more gradual removal of eye color defects.

Referring again to FIG. 2, once the eye color defect for the selected position is further corrected (block 120), the user can then highlight another corrected position on the digital image (block 122) to further correct. Alternatively, after the selected position is further corrected (block 120), electronic camera 10 can automatically advance to the next corrected position on the digital image and highlight that position. The user can then choose whether to further correct that position. When all corrected positions have been highlighted and any selected positions have been further corrected, or when a period of time has elapsed without user input (block 124), the digital image is stored in data memory 26 (block 126). The corrected digital image can also be transferred to the host computer or to an external printer (not shown) for printing.

Figure 4:
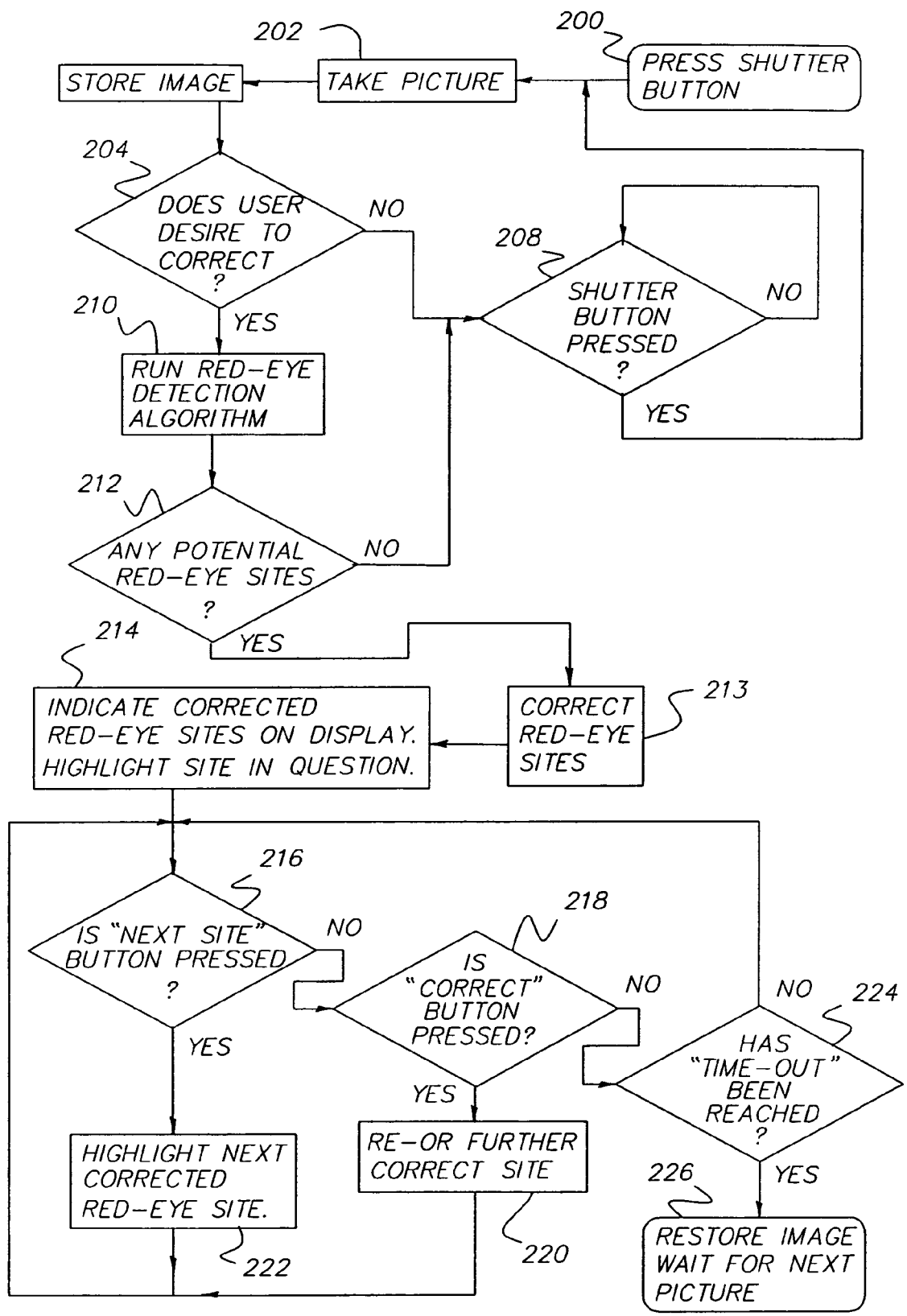
FIG. 4 is a flow diagram showing the operation of the electronic camera of FIG. 1 in accordance with a second embodiment of the present invention.

Turning now to FIG. 4, a flow diagram of the operation of electronic camera 10 in accordance with a second embodiment of the present invention is shown in which the captured images are stored prior to detection and correction of candidate positions of eye color defects. As shown in FIG. 4, an image is captured electronically (block 202) by pressing the shutter button on the electronic camera 10 (block 200). The captured image is then processed, as described above in conjunction with FIG. 1, and stored in data memory 26 (block 204). The user can then review the stored image immediately after storage or at a later time and choose whether to detect and correct any candidate positions of eye color defects in the digital image (block 206). If the user does not choose to detect and correct any candidate positions of eye color defects in the captured digital image, the user can then choose to capture another image (block 208) by pressing the shutter button on electronic camera 10.

If the user chooses to detect and correct for eye color defects, the user inputs 48 are signaled and the eye color defect detection algorithm is run (block 210). If one or more candidate positions of eye color defects have been detected in the digital image (block 212), an eye color defect correction algorithm is automatically run to correct for the eye color defect at that candidate position (block 213). Accordingly, all the detected eye color defects are automatically corrected using the eye color defect correction algorithm. Thereafter, the operation of electronic camera 10 to select and further correct particular corrected positions is the same as described in conjunction with the first embodiment of the present invention as shown in FIG. 2. Specifically, the image is displayed on LCD 24 of electronic camera 10. In addition, all corrected positions of eye color defects on the displayed image are indicated to a user by the indicator or distinctive mark, such as, for example, a cross-hair located at or proximate to each corrected position (block 214).

The user can then choose which corrected positions of eye color defects, if any, to correct by pressing, for example, button 52 (shown in FIG. 3) on electronic camera 10, to move from one corrected position to another and highlight that position (block 216). When a given corrected position of eye color defects is highlighted, the user can select to further correct that corrected position by pressing, for example, button 54 (block 218). Upon pressing button 54 (shown in FIG. 3), the eye color defect correction algorithm is automatically run to further correct for the eye color defect at that corrected position (block 220). Once the eye color defect for the selected candidate position is further corrected (block 220), the user can highlight in a conventional manner another corrected position on the digital image (block 222) by pressing button 52 and choose whether to correct that corrected position. Alternatively, after the selected position is further corrected (block 220), the electronic camera 10 automatically advances to the next corrected position on the digital image and highlights that position. The user can then choose whether to further correct that position. When all corrected positions have been highlighted and any selected positions have been further corrected, or when a period of time has elapsed without user input (block 224), the corrected digital image is restored in data memory 26 (block 226).

Computer programs or software for providing the eye color defect detection and correction algorithms in accordance with the present invention are stored in DSP 22. These computer programs or software, as well as other operating functions, can be stored on a computer readable medium which can be directly input into DSP 22. The computer readable storage medium may comprise, for example, magnetic storage media such as a magnetic disc (e.g. a floppy disc) or magnetic tape; optical storage media such as an optical disc, optical tape, or a machine readable bar code; solid state electronic storage devices such as random access memory (RAM) or read only memory (ROM); or any other physical device or medium employed to store a computer program.

Accordingly, in accordance with the present invention, there is disclosed electronic/digital camera 10 for capturing a digital image and for detecting and correcting eye color defects of a subject in the digital image, comprising: (a) image sensor 14 for capturing and digitizing an image to produce the digital image; (b) processor 22 for detecting one or more candidate positions of eye color defects in the digital image; (c) automatic correction means for applying an eye color defect algorithm to the digital image at the detected candidate positions to automatically correct for the eye color defect; and (d) presentation means including an electronic display 24 for presenting at least a portion of the digital image comprising at least one of the one or more corrected eye color defects. Electronic camera 10 can further include selection means for selecting at least one corrected eye color defect for further correction; and correction means for applying an eye color defect algorithm to the selected corrected eye color defect to further correct the eye color defect. The pixel data corresponding to the further corrected eye color defect can then be sampled to produce a sub-sampled image displayable on the display.

Figure 5A:
FIGS. 5(a)–5(f) shows examples of indicators suitable for employment by the present invention.
Figure 5B:
Figure 5C:

As indicated above, an indicator or other distinctive mark can be employed to indicate the eye color defect on the digital image which was corrected. That is, an indicator can be employed to indicate the one or more corrected eye color defects in the digital image. The indicator can be a predetermined shape such as a cross hair (as shown in FIG. 3), an icon or symbol, such as a star, circle, diamond, triangle, or square, or comprised of one or more shapes and/or symbols. Still further, the indicator can be a shadow box or shaded relative to the image. Alternatively, the image can be shaded relative to the indicator. The indicator can optionally include a number or alphabetic character so as to distinguish/number the corrected eye color defects. Such a numbering/distinction may be preferred if a plurality of eye color defects have been corrected in the digital image. FIGS. 5(a) through 5(c) provide examples of an indicator 70. Indicator 70 shown in FIG. 5(a) is configured as an eye-dropper with a drop comprising a number. Indicator 70 shown in FIG. 5(b) is configured similar to the eye-dropper of FIG. 5(a), though disposed on a background shape. Such a background shape may be desired for indicator 70 to be distinguishable (whether in color, shape, or size) from the object(s) of the digital image.

Indicator 70 can be located proximate the position of the corrected eye color defect or disposed on/over the corrected eye color defect. For example, FIG. 5(a) shows indicator 70 located proximate the eye, while FIG. 5(c) shows indicator 70 disposed overlapping the eye.

Figure 5D:
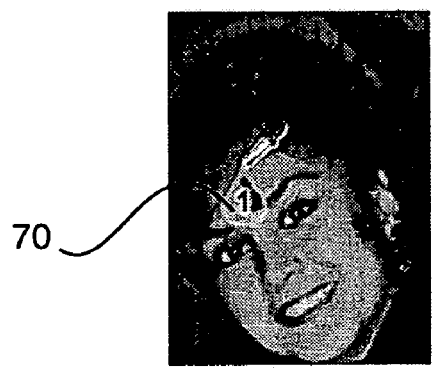
Figure 5E:
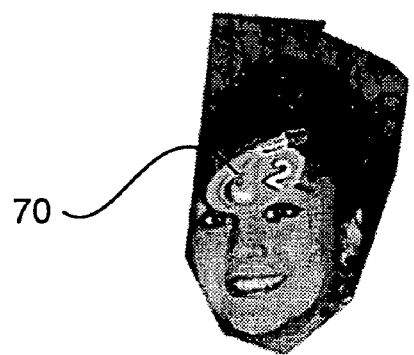

A single indicator 70 can indicate a single corrected eye color defect, as shown in FIGS. 5(a) through 5(c). Alternatively, a single indicator 70 can indicate one or more corrected eye color defects, as shown in FIGS. 5(d) and 5(e) wherein one indicator is representative of two eyes of a subject. As such, indicator 70 references a pair of eye color defects. Still further, a single indicator 70 can indicate a group of eye color defects.

Indicator 70 can comprise a predetermined color to indicate an amount/level of change of the correction. That is, the color of indicator 70 can be representative of the severity of the eye color defect which was corrected. For example, the colors red, yellow, and green can be employed, with the color red representing that the defect of the image (i.e., the eye color defect) has undergone an extreme change from the source image, the color yellow representing that the defect of the image has undergone a medium change, and the color green representing that the defect of the image has undergone a slight change.

Indicator 70 can comprise a predetermined color to indicate a level of confidence of correction. That is, the color indicator 70 can be representative of the level of confidence that the eye color defect has been correctly detected and/or corrected. For example, the colors red, yellow, and green can be employed, with the color red representing a low level of confidence, the color yellow representing a medium level of confidence, and the color green representing a high level of confidence.

Figure 5F:

Alternatively, indicator 70 can comprise a predetermined size to indicate a level of confidence of correction. That is, the size of the indicator can be representative of the level of confidence that the eye color defect has been correctly corrected. For example, as shown in FIG. 5(f), a first (small) indicator can represent a low level of confidence, while a second (larger) indicator can represent a high level of confidence.

Indicator can comprise a predetermined color to differentiate the indicator from a background portion of the digital image where the at least one indicator is located. That is, it is desirable that indicator 70 be distinguishable from the subject of the digital image so that the user can readily identify/select indicator 70. For example, an uncommon color could be employed, such as a lime green or bright orange. In another example, a blue indicator would be employed if the content of the digital image (where indicator 70 would be placed) is red, or a green indicator if the content of the digital image (where indicator 70 would be placed) is yellow.

Indicator 70 can comprise a predetermined size relative to a size of the detected eye color defect. That is, the size of the indicator can be representative of the size of the eye color defect which has been corrected. For example, if the eye color defect comprises a large portion of the image, then indicator 70 can be of a larger size. Conversely, if the eye color defect comprises a small portion of the image, then indicator 70 can be of a smaller size.

Indicator 70 can comprise a predetermined size relative to a size of the digital image. That is, the area of indicator 70 would be smaller than the digital image, but not so small as to not be distinguishable/recognizable by a user, but not so large as to obscure the content of the digital image.

Indicator 70 can comprise a predetermined size relative to a location of at least a second indicator. As such, it is preferred that adjacent indicators do not overlap or overlay so that each indicator is readily distinguishable.

Indicator 70 can comprise a predetermined size relative to a number of indicators. That is, it is preferred that one indicator does not overlap or obscure another indicator. Accordingly, if more than one indicator is employed, the indicators would be arranged to not overlap. As such, the location of indicator 70 would vary based on scene content.

Further, textual information can be provided to provide additional information regarding the eye color defect. For example, a "pop-up" text box can appear on the display when indicator 70 is selected (such as with a touch on a touchscreen, cursor, crosshairs, or other selection member). The textual information can provide specific details regarding the eye color defect, details such as the number of the eye color defect (if the number was not already displayed, i.e., number 1 of 6 eye color defects), a numerical value representative of the level of confidence of correction, a description or numerical value representative of the severity of the color defect, or a numerical value or description indicating the amount of correction required to correct the eye color defect. The pop-up box can be one level or multiple levels, that is, multiple pop-up boxes can be employed.

Alternatively, indicator 70 can comprise a shadow box or other image distortion to the digital image proximate the corrected eye color defect so as to provide a visual indication to the user of the location of the corrected eye color defect.

Audio can be employed to provide a user with instructions. As such, indicator 70 can be an audio indicator as well as (or rather than) a visual indicator. For example, the user can select a portion of the digital image, and a loud sound/signal can be emitted. Such an audio indicator can be of differing tones, levels, length, and/or pitch dependent on level of confidence of correction, the amount of correction, and so forth. Such an audio indicator may be desired for users who are visually impaired or having some color blindness.

Figure 6:
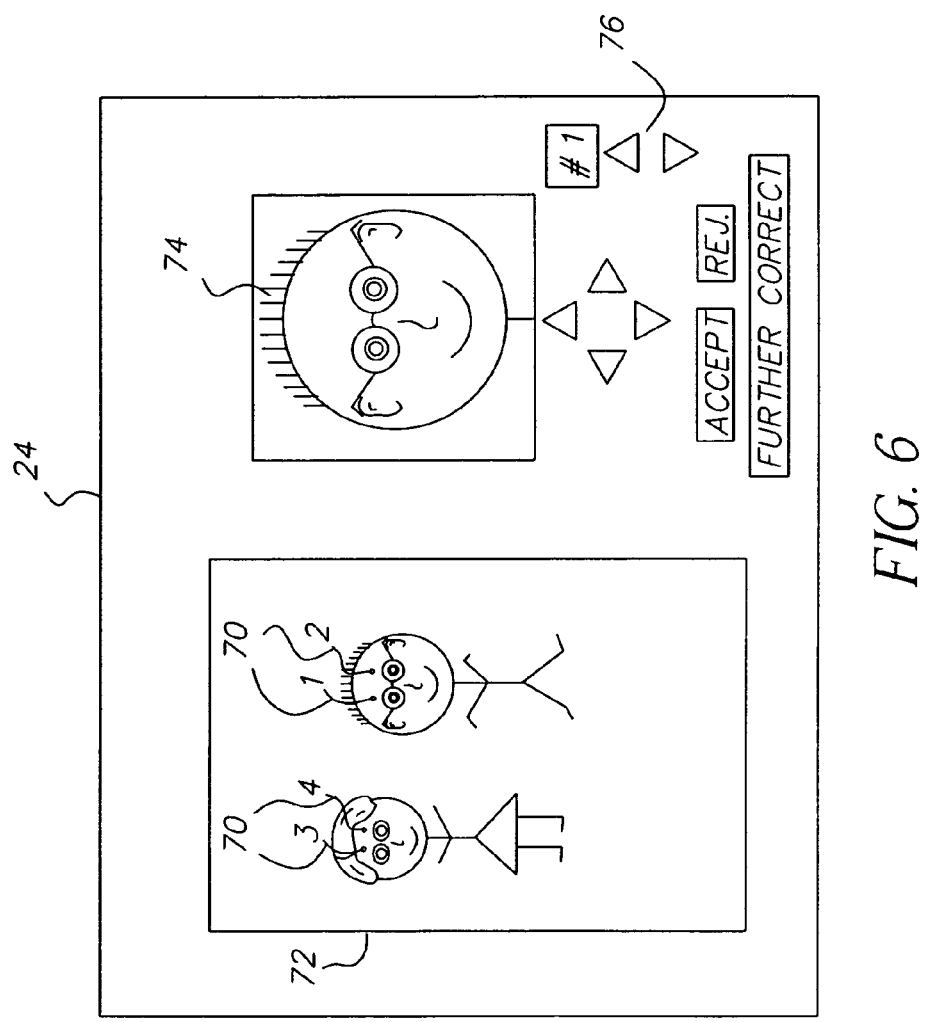
FIG. 6 shows a display having two viewing areas in accordance with the present invention.

In another arrangement, shown in FIG. 6, LCD 24 may comprise a first viewing area 72 for viewing the digital image, and a second viewing area 74 proximate first viewing area 72 for viewing an enlargement of a portion of the digital image. The user can, using a selection means 76, navigate through the corrected eye color defects for viewing, in second viewing area 74, the corrected eye color defects and/or determining whether to further correct the corrected eye color defects. Pressing selection means 76 would automatically position the selected corrected position(s) within second viewing area 74 for the user's consideration and perusal. The enlarged view of the selected corrected position will allow the user to determine if the selected corrected position is acceptable or requires further modification. Indicators 70 may or may not be viewed in second viewing area 74.

Figure 7:
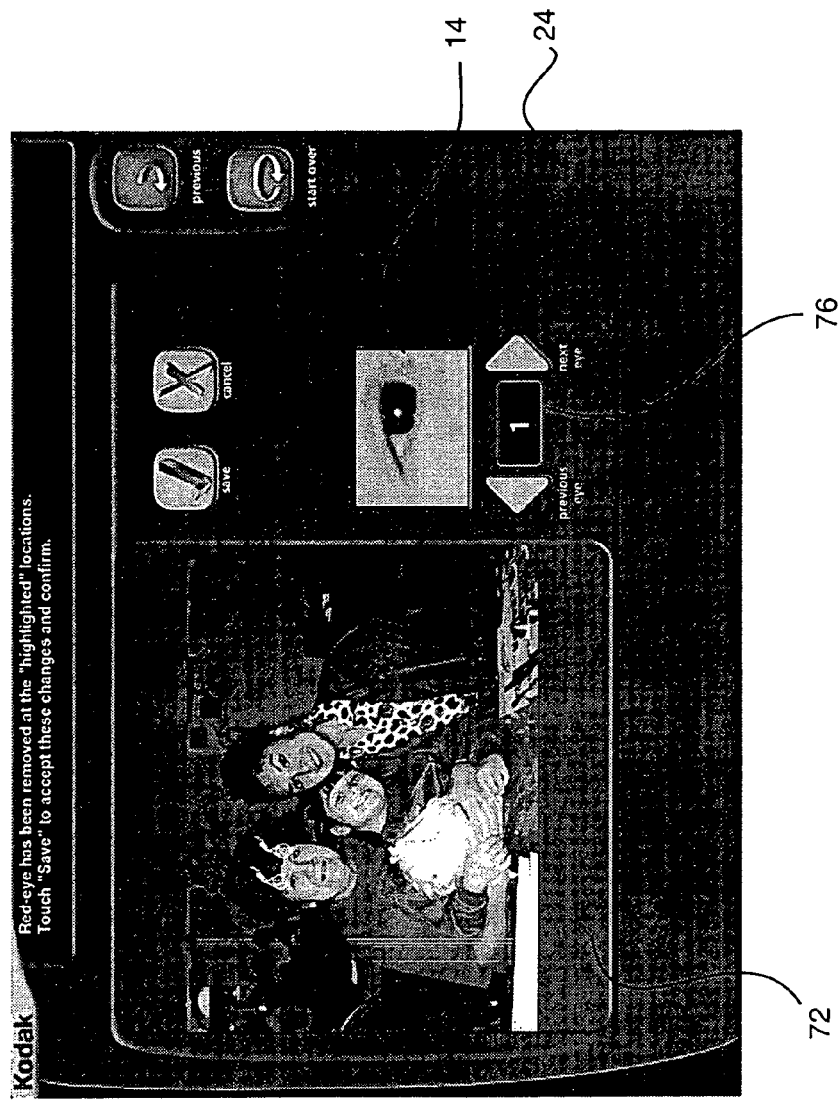
FIGS. 7 and 8 show a display having two viewing areas in accordance with the present invention.
Figure 8:
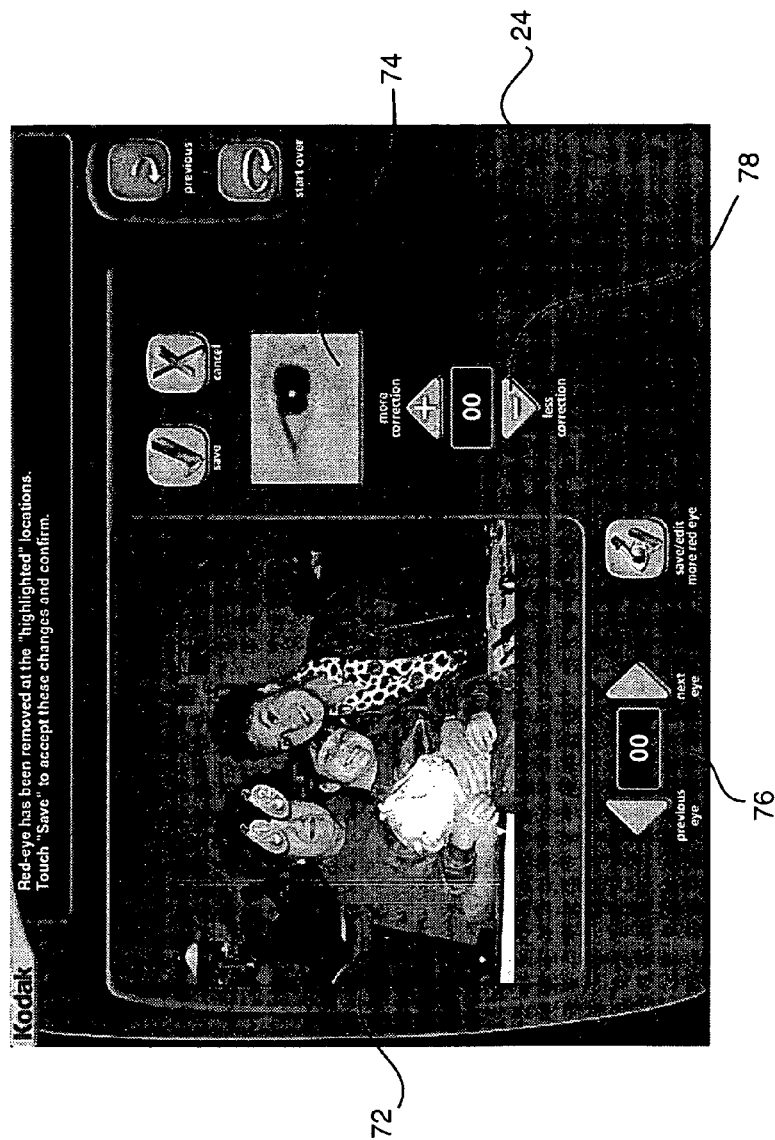

FIGS. 7 and 8 illustrate further arrangements of first and second viewing areas 72,74 for viewing and correcting eye color defects in accordance with the present invention. In FIGS. 7 and 8, selection means 76 provides a means for selecting a particular position of an eye color defect. In FIG. 8, correction means 78 provides a means for selecting/indicating/modifying a level of correction for a selected particular eye color defect.

In a further embodiment of the present invention, visual indicators can be used to indicate/mark a reviewed corrected eye color defect or to indicate/mark a further corrected eye color defect. That is, if once a corrected position has been reviewed in second viewing area 74, a visual indicator, such as a rectangle, triangle, circle, color change, shadow box, text, or the like, can be positioned on the image about the reviewed corrected position so as to provide an indicator to the user of such review. Such review can include applying further correction, not applying further correction, or rejecting the correction. (These visual indicators can be in addition indicator 70. Alternatively, indicator 70 can change physical characteristics to provide a distinction from a previously displayed indicator so as to recognize that a review has occurred.) This feature can be desirable if a large number of corrected positions are present in the image. Similarly, such a visual indicator can be noted on the image to indicate that the corrected position has been further corrected. For example, a triangular shaped indicator may indicate that the position was viewed while a rectangular shaped indicator may indicate that the position was further corrected. The visual indicator can also be a color change. For example, a bright green color indicator may indicate which position(s) was viewed while a bright orange color indicator may indicate which position(s) was further corrected. Audio indicators can also be employed. For example, a low tone sound indicator may indicate that the position was viewed while a high tone sound indicator may indicate that the position was further corrected.

Figure 9:
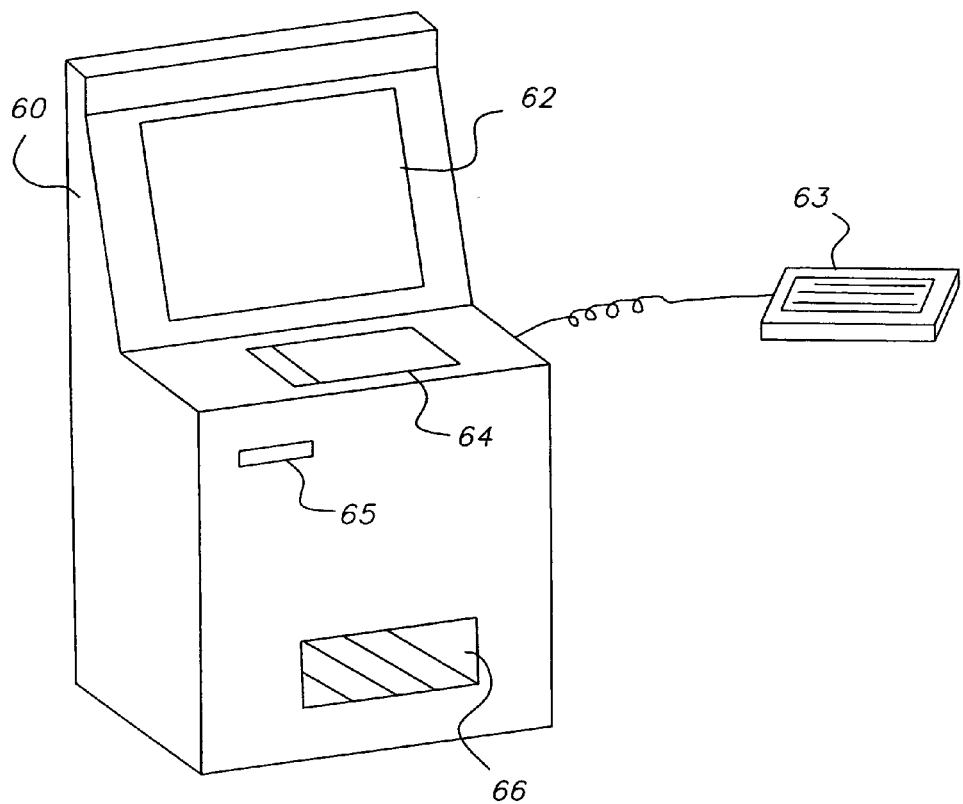
FIG. 9 generally illustrates an imaging device of a kiosk suitable for use with the present invention.
Figure 10:
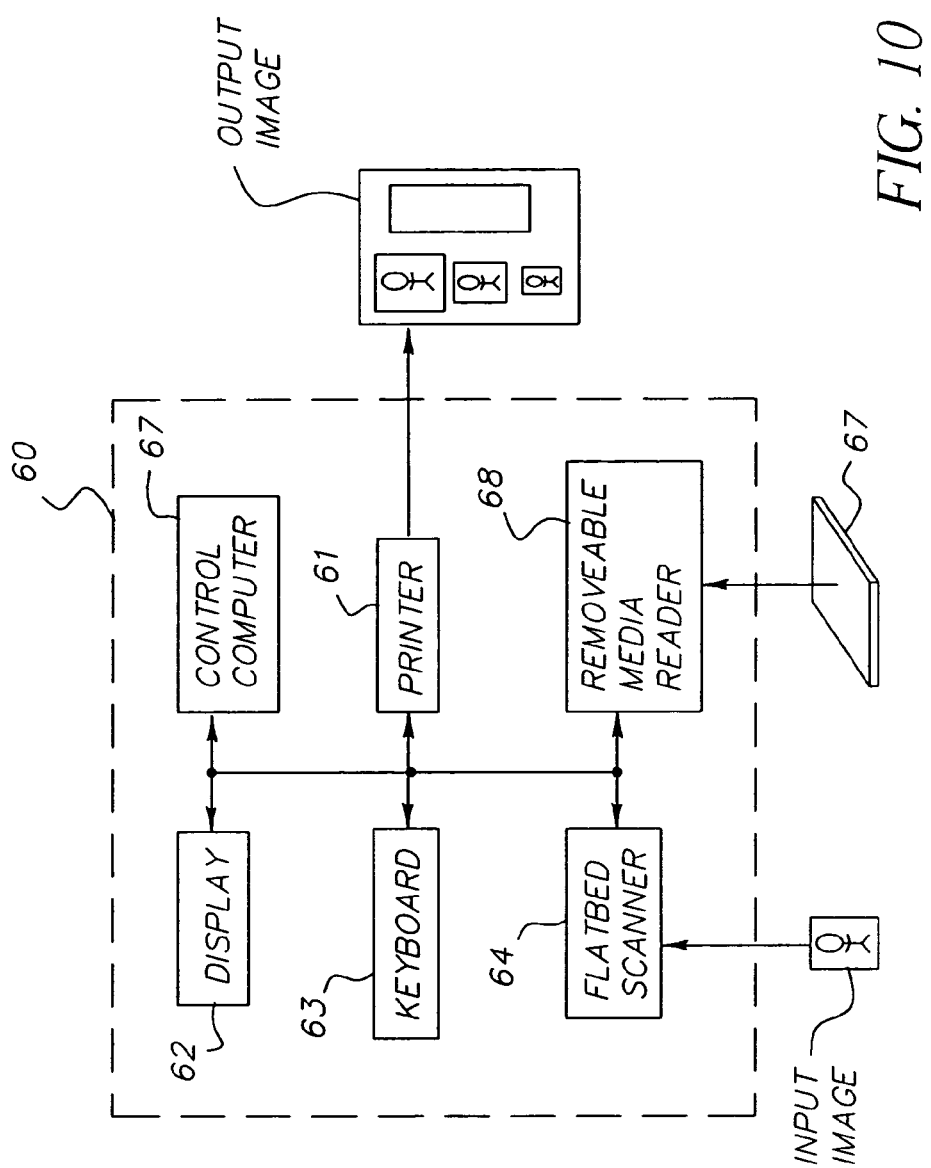
FIG. 10 is a block diagram of the kiosk in accordance with the present invention.

As noted above, the present invention can be applied to any imaging device/system which captures and/or processes digital images, including, but not limited to, a kiosk. An example of a kiosk is a Picture Maker™ kiosk produced by Eastman Kodak Company, generally illustrated in FIG. 9 as kiosk 60. FIG. 10 shows a block diagram of kiosk 60 in accordance with the present invention. Referring to both FIGS. 9 and 10, kiosk 60 includes a color display 62 for presenting information to a user and displaying the user-supplied visual image. Color display 62 can be a touchscreen display, whereby a user can provide information and data to kiosk 60, or a keyboard 63 may be used to provide information and data. A scanner 64 may be provided for receiving a user-supplied visual image and converting the visual image into digital form. Alternatively, an input port 65 may be provided for receiving the user-supplied visual image in digital form, such as from a removable media 67 (e.g., memory card, floppy disk, compact disc, or PictureCD) readable by means of a removable media reader 68. Kiosk 60 can include a delivery section 66 for controlling the delivery of a medium. Delivery section 66 is illustrated in FIG. 9 as an opening in kiosk 60. Kiosk 60 can also include a printer 61 for generating a hardcopy output of the user's image. Kiosk 60 can communicate with other systems by means of a communication network (not shown). For example, kiosk 60 may communicate with a home computer system, an Internet Service Provider (ISP), or service provider providing imaging products or having printers, for example, a wholesale photofinishing lab. Such a communication network allows a consumer/user to upload and/or download an image.

Kiosk 60 includes accessing means, such as scanner 64, input port 65 or a communication network, for accessing the digital image; (b) a processor 67 for detecting one or more candidate positions of eye color defects in the digital image; (c) automatic correction means for applying an eye color defect algorithm to the digital image at the detected candidate positions to automatically correct for the eye color defect; and (d) display 62 for presenting the digital image comprising the one or more corrected eye color defects and indicating the one or more corrected eye color defects. In a further embodiment, kiosk 60 includes means for selecting at least one corrected eye color defect and further correcting the corrected eye color defect.

Figure 11:
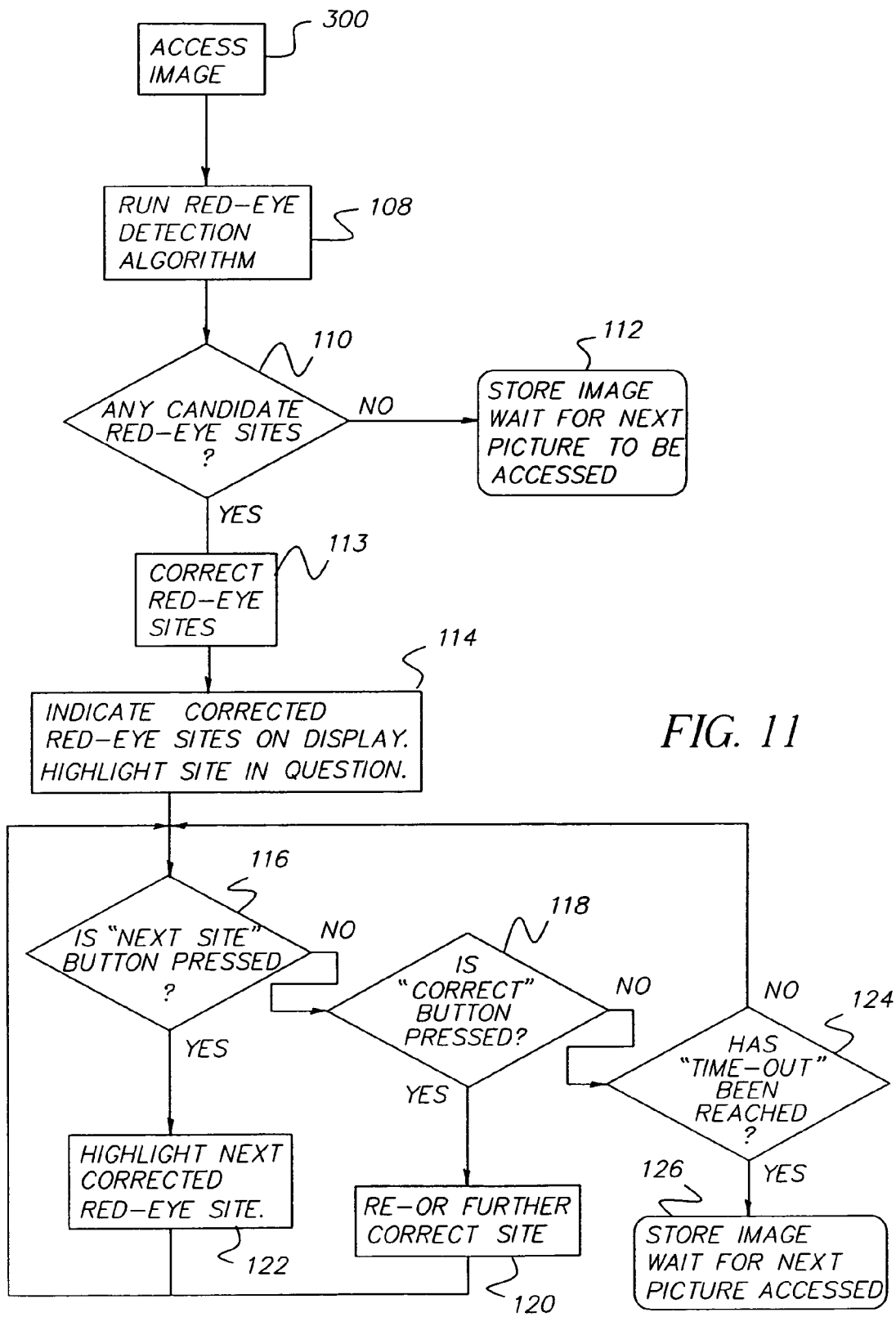
FIG. 11 is a flow diagram showing the operation of the kiosk of FIG. 10 in accordance with the present invention.

FIG. 11 shows a flow diagram of the operation of kiosk 60, whose operation is similar to that of camera 10 shown in FIGS. 2 and 4. As shown, an image is accessed (block 300) by reading a digital file from removable media 67 or scanning a image using scanner 64. An eye color defect detection algorithm is automatically run to detect for one or more candidate positions of eye color defects in digital image (block 108). Once the eye defect detection algorithm has run, it is determined if any candidate positions of eye color defects are detected in the digital image (block 110). If no candidate positions of eye color defects are detected, kiosk 60 waits for the next image to be accessed (block 112) or other instruction to kiosk 60. If one or more candidate positions of eye color defects are detected in the digital image, an eye color defect correction algorithm is automatically run to correct for the eye color defect at that candidate position (block 113). Accordingly, all the detected eye color defects are automatically corrected using the eye color defect correction algorithm.

The red-eye defect corrected image (i.e., the image comprising the corrected eye color defects, hereinafter referred to as the corrected image or enhanced image) is presented/displayed on display 62. It would be understood by one skilled in the art that at this point, display 62 can present only a portion of the digital image which contains the corrected eye color defects. In addition, all corrected positions of eye color defects are indicated on display 62 by indicator 70 or other such distinctive mark (block 114).

At this point, the user can indicate acceptance or rejection of the corrected image. In a further alternative, the user can manually move from one corrected position to another corrected position (blocks 116 and 122), and highlight that corrected position for further/additional correction. When a given corrected position is highlighted, the eye color defect correction algorithm is automatically run to further/re-correct for the eye color defect at that position (blocks 118 and 120). Alternatively, the user can select all corrected positions to be further corrected. As discussed above, the user can indicate the level of further correction at each corrected position by, for example, use of a slider control or up/down buttons (not shown), and/or select a plurality of positions and apply a single further correction to the plurality of selected positions.

Referring still to FIG. 11, once the eye color defect for the selected position is further corrected (block 120), the user can then highlight another corrected position on the digital image (block 122) to further correct. Alternatively, after the selected position is further corrected (block 120), kiosk 60 can automatically advance to the next corrected position on the digital image and highlight that position. The user can then choose whether to further correct that position. When all corrected positions have been highlighted and any selected positions have been further corrected, or when a period of time has elapsed without user input (block 124), the digital image can be stored (block 126), transmitted, or printed using printer 61.

The invention has been described in detail with particular reference to certain preferred embodiments thereof. However, it will be appreciated that variations and modifications can be effected by a person of ordinary skill in the art without departing from the spirit and scope of the invention. For example, rather than running the eye color defect detection algorithm after each image is captured and digitized, as previously described in conjunction with FIG. 2, a plurality of captured digital images which have been captured using flash illumination can be processed sequentially to detect any candidate positions of eye color defects in the digital images. The digital images in which no candidate positions are detected are stored. For each digital image in which one or more candidate positions of eye color defects are detected, the digital image is displayed on the LCD 24 of camera 10 (or display 62 of kiosk 60) and the detected candidate positions are indicated to the user on the displayed image so that the user can then selected those candidate positions to be corrected, as previously described in conjunction with FIG. 2. The eye color defect correction algorithm is then run to correct the selected candidate positions. The corrected digital image can then be stored in a manner previously described.

It is noted that the present invention has been described with reference to correcting "red eye" defects, but those skilled in the art will recognize that it is also applicable for correcting for eye color defects in animals, but that different detection and correction values in the algorithms that are specific to the subject's defective color should used.

Metadata can be attached to or associated with the digital file of the image to store information or data regarding the algorithm applied to the digital image, for example, how many times a particular algorithm has been applied to the particular image and/or, the coefficients of the algorithm applied. In addition, the metadata can be used when the digital image is further accessed, for example, the algorithm may be configured to employ different coefficients than are stored in the metadata so that different algorithms are applied to the digital image each time the digital image is accessed.

Further, the metadata can include pixel information/data. The pixel information can be the corrected pixel information and/or the pixel information previous to being corrected. The pixel information can include the entire digital image and/or just the pixels of the region of interest (i.e., those portions of the digital image having the detected eye color defects). The pixel information can be in a compressed (for example, JPEG) or uncompressed format. Including the pixel information in the metadata from previous edits (which can include a series of successive edits) allows the user to "undo" and/or "redo" in a sequential manner, the eye color defect corrections.

For example, if the eye color defects of the digital image are detected and corrected for a JPEG compressed file, the original JPEG compressed pixel information is stored in the metadata for those portions of the digital image which correspond to the pixels which have been modified during the detection/correction. This allows for the lossless reversal of the effects of the correction algorithm, if desired. In a preferred embodiment, the modified MCU blocks are compressed, and then the unchanged blocks are transcoded. By transcoding it is meant that the bits are shifted around without actually recompressing the unchanged MCU blocks. As such, a user can try the algorithm successively without permanently degrading the digital image. If the algorithm creates an undesirable effect, that effect can be reversed. Preferably, all the corrections are stored, so that using this method, the original digital image can be recovered by successively undoing the corrections.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 electronic camera
12 lens
13 aperture/shutter controller
14 image sensor
16 analog signal processor
18 analog-to-digital converter
20 frame memory
22 digital signal processor
24 image display
26 data memory
28 memory card
30 memory card slot
32 memory card interface
34 host computer interface
36 camera microprocessor 38 timing generator
40 sensor driver
42 flash unit
44 photodiode
46 exposure driver
48 user inputs
50a, 50b, 50c, 50d candidate positions of eye color defects
52 button
54 button
55 kiosk
56 printer
62 display
63 keyboard
64 scanner
65 input port
66 delivery section
67 removable media
68 removable media reader
69 computer/processor
70 indicator
72 first viewing area
73 second viewing area
76 selection means
78 correction means

What is claimed is:

1. An imaging device for correcting eye color defects of a subject in a digital image, comprising:
   (a) accessing means for accessing the digital image;
   (b) processing means for detecting one or more candidate positions of eye color defects in the digital image;
   (c) automatic correction means for applying an eye color defect algorithm to the digital image at the detected candidate positions to automatically correct for the eye color defect;
   (d) a display for presenting at least a portion of the digital image comprising at least one of the one or more corrected eye color defects; and
   (e) at least one indicator, presented on the display, indicating the at least one of the one or more corrected eye color defects.

2. The imaging device of claim 1, wherein the imaging device is a digital camera and further comprises an image sensor for capturing and digitizing an image to produce the digital image.

3. The imaging device of claim 1, wherein the at least one indicator is located proximate the at least one of the one or more corrected eye color defects.

4. The imaging device of claim 1, wherein the at least one indicator comprises a predetermined color to indicate a level of confidence of correction.

5. The imaging device of claim 1, wherein the at least one indicator comprises an audio sound to indicate a level of confidence of correction.

6. The imaging device of claim 1, wherein the at least one indicator comprises a textual information to indicate a level of confidence of correction.

7. The imaging device of claim 1, wherein the at least one indicator comprises a pop-up textual box to indicate a level of confidence of correction.

8. The imaging device of claim 1, wherein the at least one indicator comprises a predetermined color to differentiate the at least one indicator from a background portion of the digital image where the at least one indicator is located.

9. The imaging device of claim 1, wherein the at least one indicator has a predetermined shape.

10. The imaging device of claim 1, wherein the at least one indicator comprises a predetermined size to indicate a level of confidence of correction.

11. The imaging device of claim 1, wherein the at least one indicator comprises a predetermined size relative to a size of the detected eye color defect.

12. The imaging device of claim 1, wherein the at least one indicator comprises a predetermined size relative to a size of the digital image.

13. The imaging device of claim 1, wherein the at least one indicator comprises a predetermined size relative to a location of at least a second indicator.

14. The imaging device of claim 1, wherein the at least one indicator comprises a predetermined size relative to a number of indicators.

15. The imaging device of claim 1, wherein the at least one indicator comprises a number, alphabetic character, icon, or symbolic character.

16. The imaging device of claim 1, wherein the at least one indicator references a single eye color defect.

17. The imaging device of claim 1, wherein the at least one indicator references a pair of eye color defects.

18. The imaging device of claim 1, wherein the at least one indicator references a plurality of eye color defects.

19. The imaging device of claim 1, further comprising selection means for accepting the at least one of the one or more corrected eye color defects.

20. The imaging device of claim 1, further comprising selection means for rejecting the at least one of the one or more corrected eye color defects.

21. The imaging device of claim 1, further comprising:
   selection means for selecting the at least one of the one or more corrected eye color defects; and
   correction means for applying a refined defect algorithm to the selected at least one of the one or more corrected eye color defects to generate a further corrected eye color defect.

22. The imaging device of claim 21 wherein the eye color defect algorithm differs from the refined defect algorithm.

23. The imaging device of claim 21 the refined defect algorithm is the eye color defect algorithm.

24. The imaging device of claim 21, further comprising a visual indicator indicating further correction of the corrected eye color defect.

25. The imaging device of claim 21, further comprising selection means for indicating acceptance or rejection of the further corrected eye color defect.

26. The imaging device of claim 1, further comprising:
   selection means for selecting the at least one of the one or more corrected eye color defects; and
   an audio or visual indicator applied to the selected at least one of the one or more corrected eye color defect to indicate review of the selected at least one of the one or more corrected eye color defect.

27. The imaging device of claim 1, further comprising:
   selection means for selecting at least one undetected candidate position of eye color defect; and
   correction means for applying the eye color defect algorithm to digitized pixel data at the selected at least one undetected candidate position of eye color defect to correct for the eye color defect.

28. The imaging device of claim 1, further comprising metadata associated with the digital file the selected at least one of the one or more corrected eye color defect.

29. The imaging device of claim 1, further comprising metadata associated with pixel information of the digital image.

30. An imaging device for correcting eye color defects of a subject in a digital image, comprising:
  (a) accessing means for accessing the digital image;
  (b) processing means for detecting one or more candidate positions of eye color defects in the digital image;
  (c) automatic correction means for applying an eye color defect algorithm to the digital image at the detected candidate positions to automatically correct for the eye color defect;
  (d) a display comprising (i) a first viewing area displaying the digital image comprising at least one of the one or more corrected eye color defects, and (ii) a second viewing area proximate the first viewing area displaying a portion of the digital image displayed in the first viewing area; and
  (e) at least one indicator, displayed in the first viewing area or the second viewing area, indicating the at least one of the one or more corrected eye color defects.

31. The imaging device of claim 30, further comprising selection means for selecting the at least one indicator.

32. The imaging device of claim 30, further comprising correction means for applying a refined defect algorithm to digitized pixel data at the corrected eye color defect corresponding with the selected at least one indicator.

33. A method for detecting and correcting eye color defects of a subject in a digital image, comprising the steps of:
  (a) processing the digital image to automatically detect one or more candidate positions of eye color defects in the digital image;
  (b) automatically applying an eye color defect algorithm to the digital image at the detected candidate positions to automatically correct for the eye color defect;
  (c) displaying, on a display, at least a portion of the digital image comprising at least one of the corrected eye color defects;
  (d) displaying, on the display, an indicator located proximate the at least one of the corrected eye color defects indicative of the at least one of the corrected eye color defects;
  (e) providing selection means for selecting the indicator;
  (f) applying the eye color defect algorithm to the selected at least one of the corrected eye color defects to generate a further corrected eye color defect; and
  (g) presenting, on the display, at least a portion of the digital image comprising the further corrected eye color defect.

34. The method of claim 33, further comprising the step of:
  (h) displaying a second indicator located proximate the further corrected eye color defect indicative of the further corrected eye color defect.

35. The method of claim 34, further comprising the step of:
  (i) providing selection means for selecting the second indicator.

36. The method of claim 33, further comprising the step of:
  (h) storing metadata with the digital image, the metadata comprising pixel information which corresponds with the corrected eye color defects.

37. The method of claim 36, further comprising the step of:
  (i) applying the stored pixel information of the metadata to the digital image.

38. A computer storage product having at least one computer storage medium having instructions stored therein causing one or more computers to perform the method of claim 33.

39. A method for detecting and correcting eye color defects of a subject in a digital image, comprising the steps of:
  (a) processing the digital image to automatically detect one or more candidate positions of eye color defects in the digital image;
  (b) automatically applying an eye color defect algorithm to the digital image at the detected candidate positions to automatically correct for the eye color defect;
  (c) displaying, in a first viewing area of a display, the digital image comprising the corrected eye color defects;
  (d) displaying, in a second viewing area of the display proximate the first viewing area, a portion of the digital image displayed in the first viewing area;
  (e) displaying, in the first viewing area of the display, an indicator located proximate at least one of the corrected eye color defects indicative of the at least one of the corrected eye color defects; and
  (f) providing selection means for selecting the indicator.

40. The method of claim 39, further comprising the steps of:
  (g) applying the eye color defect algorithm to the selected at least one of the corrected eye color defects associated with the indicator to generate a further corrected eye color defect; and
  (h) displaying, in the second viewing area, at least a portion of the digital image comprising the further corrected eye color defect.

41. An imaging device for correcting an image artifact of a subject in a digital image, comprising:
  (a) accessing means for accessing the digital image;
  (b) processing means for detecting one or more candidate positions of eye color defects in the digital image;
  (c) automatic correction means for applying an image artifact removal algorithm to the digital image at the detected candidate positions to automatically correct for the image artifact;
  (d) a display for presenting at least a portion of the digital image comprising at least one of the one or more corrected image artifacts; and
  (e) at least one indicator, presented on the display, indicating the at least one of the one or more corrected image artifacts.

42. The imaging device of claim 41, wherein the image artifact includes scratches, tears, dust, blemishes, wrinkles, creases, hair, and specular highlights due to flash illumination.

* * * * *